(12) United States Patent
Maddern et al.

(10) Patent No.: US 11,120,420 B2
(45) Date of Patent: Sep. 14, 2021

(54) MOBILE ON-CARD IN-APP COMMERCE

(71) Applicant: Button Inc., New York, NY (US)

(72) Inventors: Christopher James Maddern, New York, NY (US); Michael Edward Jaconi, New York, NY (US); Michael John Wakerly, New York, NY (US); Michael John Dudas, New York, NY (US)

(73) Assignee: Button, Inc., Greenwich, CT (US)

( * ) Notice: Subject to any disclaimer, the term of this patent is extended or adjusted under 35 U.S.C. 154(b) by 415 days.

(21) Appl. No.: 15/719,280

(22) Filed: Sep. 28, 2017

(65) Prior Publication Data

US 2018/0096339 A1    Apr. 5, 2018

Related U.S. Application Data

(60) Provisional application No. 62/402,143, filed on Sep. 30, 2016.

(51) Int. Cl.
*G06Q 20/32*    (2012.01)
*G06Q 30/02*    (2012.01)
(Continued)

(52) U.S. Cl.
CPC .......... *G06Q 20/322* (2013.01); *G06N 5/022* (2013.01); *G06Q 20/12* (2013.01); *G06Q 20/3829* (2013.01); *G06Q 30/0601* (2013.01)

(58) Field of Classification Search
CPC .......................... G06Q 20/322; G06Q 30/0267
See application file for complete search history.

(56) References Cited

U.S. PATENT DOCUMENTS

2012/0290338 A1    11/2012  Gascoigne
2012/0323722 A1*   12/2012  Khetrapal ............. G06Q 30/02
                                                    705/26.4
(Continued)

FOREIGN PATENT DOCUMENTS

WO        2016060807 A1    4/2016
WO   WO-2016060807 A1 *    4/2016   ......... G06Q 30/0256

OTHER PUBLICATIONS

Travel Guide to Destinations in Asia & Europe, Easy Steps to Use Didi Through WeChat, https://hastalasvistas.net/2017/09/01/wechatdidi/, Sep. 1, 2017.*

(Continued)

*Primary Examiner* — Hao Fu
(74) *Attorney, Agent, or Firm* — Lerner, David, Littenberg, Krumholz & Mentlik, LLP

(57) ABSTRACT

At least one next-action relevant to a publisher application and at least one service provider application associated with the at least one next-action is received at the publisher application and from a backend service. The at least one next-action is rendered, where a user's interaction with the rendered at least one next-action enables the user to preview inventory information from the at least one service provider application and to place an order. Payment information of the user is received at the publisher application and from a payment provider. The order and the payment information is sent to the service provider application though the backend service, and a status of the order is presented to the user.

17 Claims, 5 Drawing Sheets

(51) Int. Cl.
*G06N 5/02* (2006.01)
*G06Q 20/12* (2012.01)
*G06Q 20/38* (2012.01)
*G06Q 30/06* (2012.01)

(56) References Cited

U.S. PATENT DOCUMENTS

2013/0346203 A1    12/2013   Afshari
2014/0172986 A1*   6/2014   Kumar ................ G06Q 10/107
                                                709/206
2014/0207575 A1*   7/2014   Freed-Finnegan ..........................
                                             G06Q 30/0641
                                                     705/14.58
2016/0239534 A1    8/2016   Evans

OTHER PUBLICATIONS

International Search Report and Written Opinion in International Application No. PCT/US2017/54308, dated Dec. 15, 2017, 19 pages.
Extended European Search Report including Written Opinion for Application No. EP17857500.7, dated Apr. 2, 2020, pp. 1-9.

* cited by examiner

MOBILE ON-CARD IN-APP COMMERCE

CROSS-REFERENCE TO RELATED APPLICATIONS

This application claims the benefit of priority to U.S. Provisional Patent Application Ser. No. 62/402,143, filed Sep. 30, 2016, the contents of which are hereby incorporated by reference.

BACKGROUND

When a user is working within a mobile application (or "app") on a mobile computing device (MCD) and desires to purchase an item from a third-party, the user often must leave the mobile app currently in use in and switch to a separate third-party app to purchase the item. For example, the user is using a FOURSQUARE mobile app and the FOURSQUARE app displays a recommendation for a great restaurant to the user. If the user wants to call an UBER car to go to the restaurant, the user then must leave the FOURSQUARE app and switch to an UBER app to request a car. Additionally, if the user does not have the UBER app on their MCD, they must first install the UBER app, which causes both delay and inconvenience to the user.

SUMMARY

The present disclosure describes in-application (or "in-app") commerce on a mobile computing device.

In an implementation, at least one next-action relevant to a publisher application and at least one service provider application associated with the at least one next-action is received at the publisher application and from a backend service. The at least one next-action is rendered, where a user's interaction with the rendered at least one next-action enables the user to preview inventory information from the at least one service provider application and to place an order. Payment information of the user is received at the publisher application and from a payment provider. The order and the payment information is sent to the service provider application though the backend service, and a status of the order is presented to the user.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations so as to realize one or more of the following advantages. First, the described subject matter enables inventory from one mobile app to be offered and purchased within another mobile app. The described approach can enhance a user's experience with a mobile app because the user can select and purchase items from a range of third-party merchant apps without leaving the app the user is currently in and without even installing these third-party apps. Second, the described approach can provide a simple solution for a mobile app to sell relevant items and services from other third-party merchant apps by simply including a software development kit (SDK) in the mobile app. Third, the described approach can improve utility of a mobile app by predicting third-party merchant apps relevant to the mobile app and providing real-time inventory information from these merchant apps to the user. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

Figure 1:
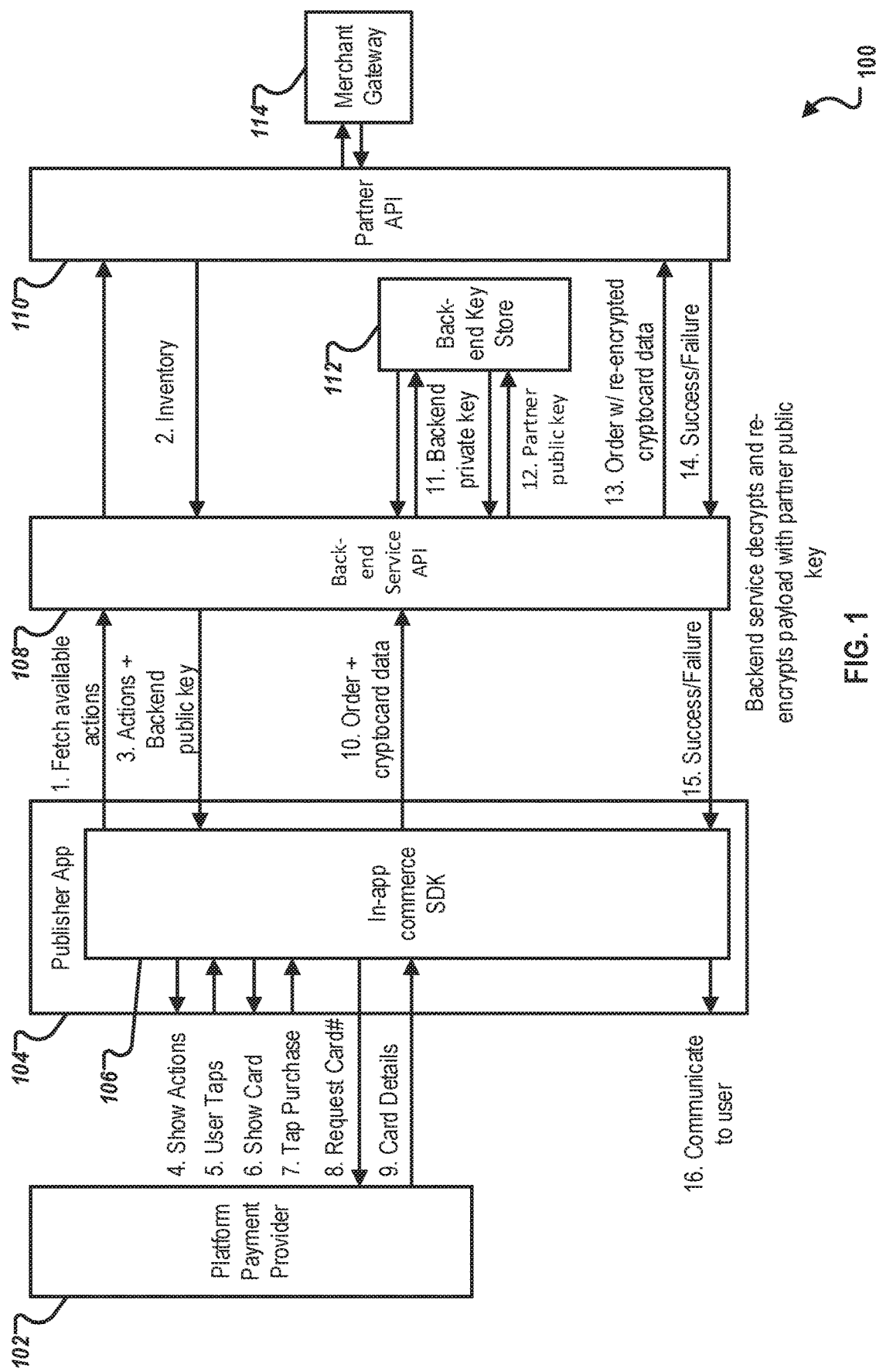
FIG. 1 is a block diagram illustrating an example of a distributed computing system that provides in-application (or "in-app") commerce on a mobile computing device (MCD), according to an implementation.

The following detailed description describes in-application (or "in-app") commerce on a mobile computing device (MCD), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

When a user is working within a mobile application (or "app") on a MCD and desires to purchase an item from a third-party, the user often must leave the mobile app currently in use in and switch to a separate third-party app to purchase the item. For example, the user is using a FOURSQUARE mobile app and the FOURSQUARE app displays a recommendation for a great restaurant to the user. If the user wants to call an UBER car to go to the restaurant, the user then must leave the FOURSQUARE app and switch to an UBER app to request a car. Additionally, if the user does not have the UBER app on their MCD, they must first install the UBER app, which causes both delay and inconvenience to the user.

At a high-level, the described in-app commerce approach is a distributed computing solution that allows a user to be offered, select and then purchase a relevant item or service of a third-party merchant (service provider or commerce partner) natively from within the mobile app of a different merchant (publisher app), for example, booking an UBER ride (in this case, UBER is a third-party merchant) from a non-UBER app (the publisher app) that displays a UBER booking option on a graphical user interface (GUI) pop-up card inside of the publisher app. In some implementations, payment mechanisms provided by a mobile computing device operating system (for example, APPLE pay or ANDROID pay) can be used to facilitate easy capture and processing of the user's credit or debit card and personal information. The described in-app commerce can be applied to a broad range of items from retail to tickets, reservations, services, deals etc. Payment can be facilitated in a number of ways, for example, by using existing platform payment providers (such as, APPLE pay or ANDROID pay), entry of credit or debit card information on the pop-up card within the publisher app, or account sign-in (for example, using OAuth requests to the commerce partner) on the pop-up card.

The described functionality eliminates ecommerce steps and increases the overall usability, efficiency, security, etc. of ecommerce actions performed on MCDs. In particular, users are no longer required to leave a currently used app to navigate to (and potentially having to install) a different merchant's app to complete routine and standard ecommerce actions (such as, setting up a reservation, scheduling transportation, etc.). The user is required to rely on the different merchant's app only for more complex operations (such as, cancellations, modifications, etc.).

The described approach provides any merchant app publisher an out-of-the-box commerce solution for their app that will let the publisher sell relevant third-party items and services with no need to configure any of the usual third-party merchant accounts, take payments, etc. The described approach also proactively gathers dynamic inventory information from third-party merchant and renders the inventory information in real-time in the publisher's app. The real-time inventory information is related to inventory availability from a particular third-party merchant app (for example, a capability to fulfill predicted one or more next-actions (such as, available cars and reservation times associated with an UBER-like or OPENTABLE-like online service) can be presented natively in the publisher's app in use by a user and the user can complete a purchase by sharing payment credentials, user information, etc. from payment providers (such as, those described above).

The disclosure describes integrating a software development kit (SDK) into a mobile app (the publisher app) so that the mobile app is connected to a backend service. When a user is working with the mobile app, the mobile app can send information of a user-accessed web page (for example, a Uniform Resource Locator (URL) associated with the web page) to the backend service. The backend service can predict next-actions (that is, the actions the user would like to perform next) based on, for example, the content of the web page, identify service providers (third-party merchants) that can fulfill the predicted next-actions, collect inventory information from these service providers, and send the next-actions and inventory information to the mobile app. An inventory can be considered any unit of a product, item, or service that can be offered to a user for purchase (for example, an UBER fare, a universal product code (UPC) item, a ticket to a show, etc.). The mobile app can present the received next-actions and inventory information to the user. The user can then select inventory items and purchase the selected items from the third-party merchant from within the mobile app.

As a specific example, the user is in a FOURSQUARE app that has integrated the described SDK. The user clicks a hyperlink associated with a restaurant that FOURSQUARE has recommended. The FOURSQUARE app sends the restaurant link to the backend service. The backend service can perform a contextual analysis based on the content of the restaurant page and determine next-actions the user might perform. For example, next-actions can include making a reservation with the restaurant, requesting a ride to the restaurant, having food delivered form the restaurant, etc. In this example, the backend service can identify that OPENTABLE is an appropriate service provider providing reservation services and an app and an UBER is an appropriate service provider providing transportation services and an app. The backend service can query OPENTABLE and UBER for inventory information (such as, available reservation times and party size at the restaurant and available UBER cars). The backend service can send the next-actions and inventory information to the FOURSQUARE app for presentation to the user. For example, the FOURSQUARE app can present, within the restaurant page, two graphical user interface (GUI) elements (such as, buttons or icons) indicating "reserve with OpenTable" and "ride there with Uber," respectively. If the user taps or clicks on the button of "ride there with Uber," available cars from UBER are displayed. The user can select a car and complete payment within the FOURSQUARE app and not have to leave the FOURSQUARE app to work in the UBER app to schedule transportation. In this example, FOURSQUARE is considered a publisher app, and OPENTABLE and UBER are considered commerce partner apps.

FIG. 1 is a block diagram illustrating an example distributed computing system (EDCS) 100 that provides in-app commerce on a MCD, according to an implementation. FIG. 1 also provides a flow chart of an example method for providing the described in-app commerce, according to an implementation. For clarity of presentation, the description generally describes the method in the context of some or all of the other figures associated with this disclosure. However, it will be understood that the illustrated method may be performed, for example, by any suitable system, environment, software, and hardware, or a combination of systems, environments, software, and hardware as appropriate. In an implementation, various steps of the method can be run in parallel, in combination, in loops, or in any order.

The example system 100 includes a platform payment provider 102, a publisher app 104 including an in-app commerce SDK 106, a backend service application programming interface (API) 108 connected to a backend key store 112, a partner API 110, and a merchant gateway 114. The publisher app 104 can be on a user's MCD. The backend service API 108 can be used to access backend services, as described above, that predict next-actions relevant to the publisher app 104 and associated service providers and inventory information. The partner API 110 can be used to access a commerce partner's services. For facilitating in-app purchase, the described system 100 integrates the publisher app 104 with the commerce partner APIs 110, and operates the backend key store 112 to be able to sign payment requests for each commerce partner. In some implementations, the backend service or the backend service API 108 can also integrate with partners' inventory APIs for inventory query.

At step 1, the in-app commerce SDK 106 integrated with the publisher app 104 sends a request to the backend service through the backend service API 108, requesting the backend service to send back contextual next-actions relevant to the content of the web page the user is currently on. In some implementations, the in-app commerce SDK 106 includes the URL of the web page the user is working with in the request. In some implementations, the in-app commerce SDK 106 can also send other user-specific information to the backend service through the backend service API 108. The other user-specific information can include the user's current location or the user's proprietary identifier or account information with the partner (that is, a third-party user identifier or account information, such as the user's UBER account information), device type and operating system of the MCD, user's past behavior data (for example, the user has been choosing UBER more often than YELLOW CAB for transportation), and other data consistent with this disclosure.

The in-app commerce SDK 106 can send a user location to the backend service (note that the user may be required to opt in for location sharing, for example, by allowing the mobile browser/app access to the user location from the MCD/operating system) to enable retrieval and display of location-based inventory. The user may allow the in-app commerce SDK 106 to share the user's third-party identifier or account information with the backend service in order to facilitate loyalty offers and functionalities (for example, points or cashback). The user may also allow in-app commerce SDK 106 to share device type and operating system of the MCD with the backend service so that the backend service can find appropriate commerce partner apps matching the MCD's device type and operating system. The user-specific information can be appended to the request (the request sent by the in-app commerce SDK 106 requesting a list of contextual next-actions) as standard HTTP POST request data. The in-app commerce SDK 106 or the publisher app 104 may offer the user options whether the user would like to share URL or user-specific information with the backend service. If a user chooses to opt out of location sharing and third-party identifier/account sharing, reduced functionality can be provided (such as, reduced loyalty offerings and other functionality). If the user opts out of URL sharing and device/operating system sharing, the functionality of providing a list of contextual next-actions can be disabled in entirety. In some implementations, URL and other information that has been shared with the backend service can be automatically cleared after a short time period (for example, a statically-predefined or dynamically-generated period of time), or can be immediately deleted at the request of the user.

The backend service analyzes the content of the web page (for example, metadata of the web page, and text, links and images in the web page) and predicts next-actions the user might perform. In some implementations, the backend service analyzes the content of the web page by parsing the HTML at the URL. For example, methods employed for analyzing the content can include, but are not limited to: 1) Natural Language Processing (action intent inference based on a mathematical function that maps unstructured text (extracted from the URL content) to structured action/intent context); 2) Natural Entity Recognition and Disambiguation (entity identification—such as, places, products, venues, artists, movies—based on a mathematical function that maps unstructured text (for example, extracted from the URL content) and parsed URL hyperlinks (for example, extracted from the URL content); 3) Entity Harmonization (cross-service entity identification based on a mathematical function that maps an entity identified in one service to the same entity in all other services (for example, matching a FOURSQUARE restaurant identifier to an OPENTABLE restaurant identifier when they represent the same restaurant)); and 4) Multi-page URL traversal (the application of 1 and 2 and 3 to linked web URL (as extracted from the URL content) over multiple page "jumps."

The backend service can also identify service providers (third-party merchants or commerce partner) that can fulfill the next-actions. For example, the user is currently on a restaurant web page, the backend service can determine that the relevant next-actions can be making a reservation and requesting a ride to the restaurant. The backend service can also identify that OPENTABLE can be the third-party merchant for reservations and UBER can be the third-party merchant for transportation. In some implementations, the backend service can determine third-party merchants based on various information, such as the user's past behavior (for example, the merchant the user most often uses), whether the user has a merchant's app installed on the MCD, etc. In some implementations, a JavaScript Object Notation (JSON) data structure can be used for defining relevant next-actions. Other data structure formats are also considered to be within the scope of this disclosure.

In some implementations, upon receiving the URL (and the user-specific information), the backend service can identify relevant next-action use cases associated with the URL (that is, actions relevant to the URL that the user might next perform). In some implementations, the backend service can identify relevant next-action use cases by evaluating the content of the web page of the URL (for example, metadata of the web page, text, links, images in the web page, etc.) and computing a measure of contextual utility for each use case. The measure of contextual utility can indicate relevance between a use case and context of the URL. In some implementations, the backend service may consider only the use cases having a measure of contextual utility above a predetermined threshold. Given the identified next-action use cases, the backend service can identify third-party merchants that can fulfill the identified next-action use cases. From step 1, the method proceeds to step 2.

At step 2, the backend service API 108 queries the third-party merchant through the partner API 110 for inventory information. For example, the backend service API 108 can query the UBER API and the OPENTABLE API for inventory information (such as, available cars and reservation times). In some implementations, the backend service API 108 can also send user and other information to the partner API 110 for inventory information. For example, the backend service API 108 can send the user's current location to UBER API for available cars. From step 2, the method proceeds to step 3.

At step 3, the backend service API 108 sends information of the predicted next-actions, service providers, and inventory information to the in-app commerce SDK 106, for example, using a data object. The backend service API 108 also typically sends a backend public key to the in-app commerce SDK 106. The backend public key can be a cryptographic key that can be used by an entity to encrypt messages intended for the backend service API 108. In some implementations, the backend public key can be a static key that is stored at the backend service API 108.

In some implementations, based on the identified next-action use cases, the queried inventory, and other information (for example, user-specific information, such as user location information, user's third-party identifier or account information, device type and operating system of the MCD, and user's past behavior data), the backend service can compile a list of next-actions to return to the in-app commerce SDK 106. For example, the backend service may only include next-actions that can be fulfilled by at least one third-party merchant based on a determined inventory availability. The backend service can compile the actions in a data object and return to the in-app commerce SDK 106. In some implementations, the data object can also include the third-party merchants that can provide the services and associated inventory information. In still other implementations, the compiled data can be returned to the in-app commerce SDK 106 in multiple data objects.

In some implementations, the backend service can return a prioritized list of next-actions to the in-app commerce SDK 106 through the backend service API 108. For example, for each next-action use case that has been identified, the backend service can iterate through third-party merchants determined to be able to fulfill the use case. The backend service can communicate with the merchants' APIs to obtain real time inventory and determine whether or not the merchants can fulfill the particular use case based on an understanding of available inventory. Action ranking based on inventory can be based on data parameters, primarily related to context and intent that has been inferred from the web page. For example, if the web page is related to dining at a Restaurant A in New York City (NYC), the backend server 106 may determine that there are two potential next-action use cases: 1) make a dinner reservation in NYC and 2) to make a dinner reservation at Restaurant A. By iterating through service providers using queries to service providers' APIs, the backend server 106 may identify two merchants that can fulfill at least one of the use cases: 1) Merchant A has reservations/restaurants available in NYC, and 2) Merchant B has reservations/restaurants in NYC and at Restaurant A. Based on this information, the action/inventory returned by Merchant B for the exact restaurant would be ranked above Merchant A due to a better match to the context inferred from the current web page. In other words, the backend service will prioritize the action "making a reservation with Merchant B" over the action "making a reservation with Merchant A." Now consider a different scenario. If Merchant B does not have reservations available at Restaurant A for a couple months and also has a limited supply of restaurants available in NYC, the action/inventory associated with Merchant A may be ranked higher than Merchant B.

In some cases, the backend server 106 can prioritize next-actions based on user-specific information. For example, if the restaurant is far away from the user's current location, the actions of food delivery and a taxi ride may be ranked lower than the action of making a reservation. If the in-app commerce SDK 106 provides the user's third-party identifier or account information, the backend service can prioritize merchants and inventory that are part of rewards/loyalty programs over those that do not offer cashback/rewards. In some cases, the backend service may prioritize service providers providing instant offers and rebates. From step 3, the method proceeds to step 4.

At step 4, the in-app commerce SDK 106 instructs the publisher app 104 to present the actions to the user within the web page the user is currently on, for example, by displaying a button for each action. In some implementations, the publisher app 104 can also present the service providers to the user. For example, the publisher app 104 can display one button indicating "reserve with OpenTable" and another button indicating "ride there with Uber" in the restaurant web page. From step 4, the method proceeds to step 5.

At step 5, the user selects one of the actions, for example, by tapping or clicking on one of the buttons. From step 5, the method proceeds to step 6.

At step 6, the in-app commerce SDK 106 instructs the publisher app 104 to present inventory information to the user based on the selected action. For example, if the user taps on the button "ride there with Uber," the publisher app 104 displays available cars in a GUI pop-up card or window that overlays the current display in the publisher app. In some implementations, the pop-up card is modal and disables other app functionality when opened. From step 6, the method proceeds to step 7.

At step 7, the user selects an inventory item to purchase, for example, by tapping on one of the inventory items displayed in the GUI pop-up card. From step 7, the method proceeds to step 8.

At step 8, the in-app commerce SDK 106 sends a message to the platform payment provider 102 requesting the user's payment information, for example, credit card or debit card information. From step 8, the method proceeds to step 9.

At step 9, the platform payment provider 102 sends the payment information to the in-app commerce SDK 106. From step 9, the method proceeds to step 10.

At step 10, the in-app commerce SDK 106 sends a message to the backend service API 108 including the inventory item the user desires to purchase and the user's payment information. In some implementations, the message at step 10 can be encrypted using the backend public key that was received at step 3. From step 10, the method proceeds to step 11.

At step 11, the backend service API 108 communicates with the backend key store 112 to request a backend private key that can be used by the backend service API 108 to decrypt the encrypted messages received at step 10. In some implementations, the backend key store 112 provides secure storage of public/private keys and to retrieve keys on demand. For example, upon receiving a request with a partner identifier (for example, "1234" for UBER), the backend key store 112 can return a public key file for that partner. From step 11, the method proceeds to stop 12.

At step 12, the backend service API 108 communicates with the backend key store 112 to request a partner public key that can be used by the backend service API 108 to encrypt messages intended for the partner API 110. From step 12, the method proceeds to step 13.

At step 13, the backend service API 108 sends the inventory item the user desires to purchase and the user's payment information to the partner API 110 (that is, forwarding the information received at step 10 to the partner API 110). The backend service decrypts the message received at step 10 using the backend private key obtained at step 11 and re-encrypts the message using the partner public key obtained at step 12, and sends the re-encrypted message to the partner API 110. The backend service decrypts and re-encrypts data so that it is easy for the commerce partner (third-party merchant) to process the data. Upon receiving the information of the inventory item the user desires to purchase and the user's payment information, the partner API 110 can communicate with the merchant gateway 114 for processing the purchase order, and the merchant gateway 114 notifies the partner API 110 of the order status, for example, whether the order has been successfully processed. From step 13, the method proceeds to step 14.

At step 14, the partner API 110 forwards the order status to the backend service API 108. From step 14, the method proceeds to step 15.

At step 15, the backend service API 108 forwards the order status to the in-app commerce SDK 106. From step 15, the method proceeds to step 16.

At step 16, the in-app commerce SDK 106 instructs the publisher app 104 to present the order status to the user. For example, the publisher app 104 can pop up a card or a window to display the order status. After step 16, the method stops.

Figure 2A:
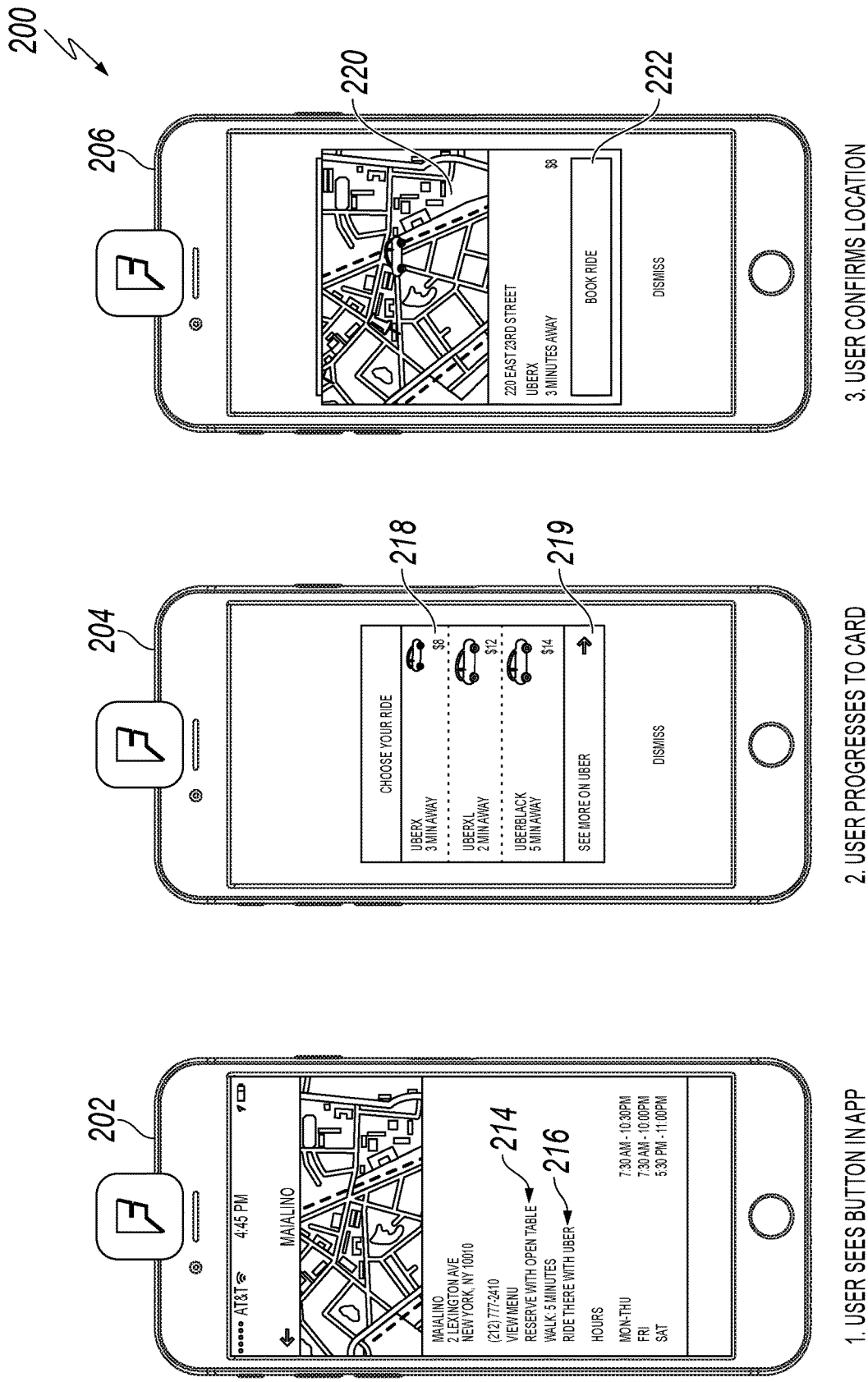
FIGS. 2A and 2B provide example screenshot illustrations of an example user flow for in-app commerce, according to an implementation.
Figure 2B:
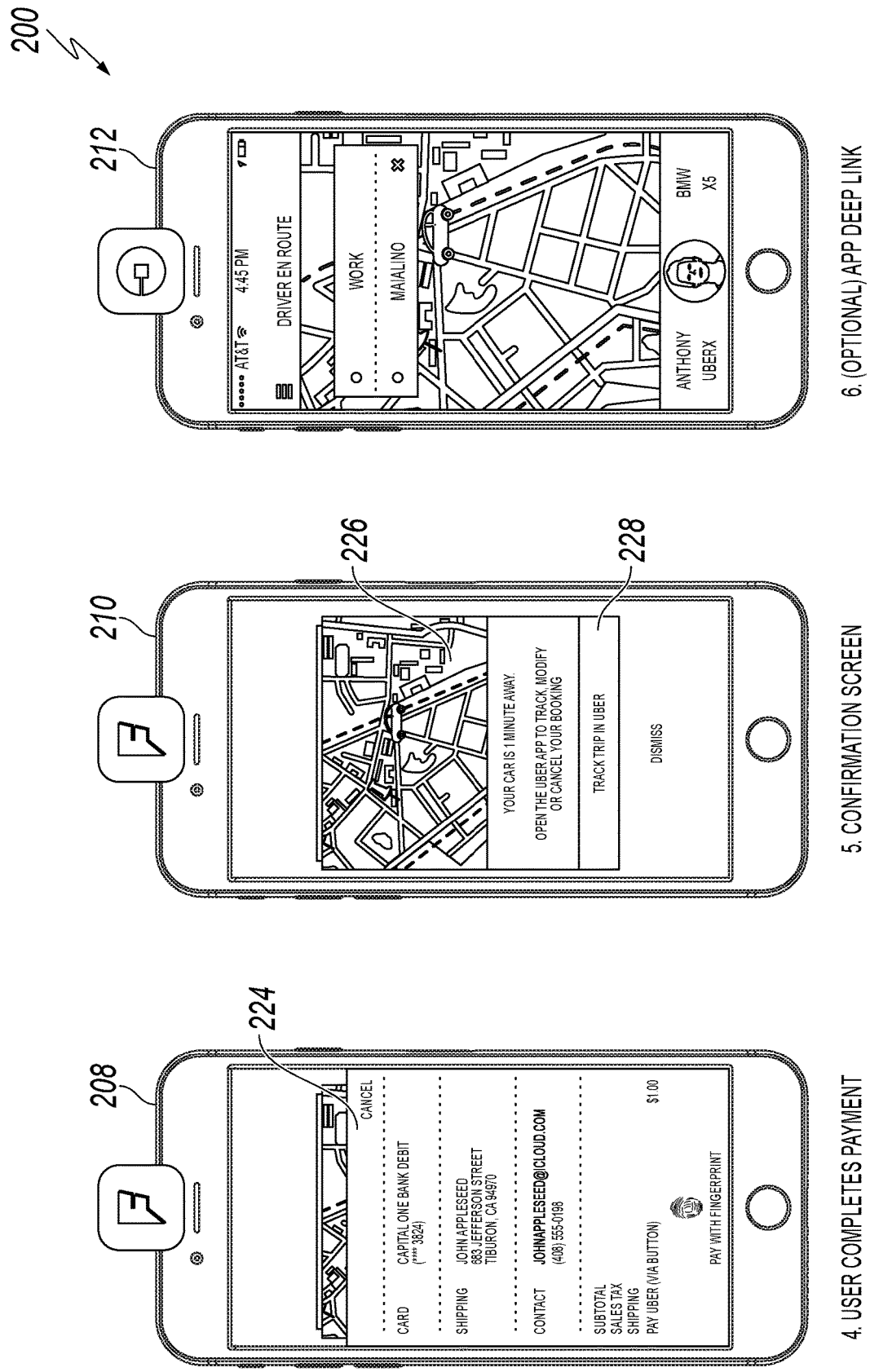

FIGS. 2A and 2B provide example screenshot illustrations of an example user flow 200 for in-app commerce, according to an implementation. The user flow 200 includes screen shots 202, 204, 206, 208, 210, and 212 of an MCD, and uses UBER as a third-party merchant and a FOURSQUARE app as a publisher app. Screen shot 202 shows that the FOURSQUARE app presents a restaurant web page to the user. Within the restaurant web page, the FOURSQUARE app also presents a button 214 "Reserve with OpenTable" and a button 216 "Ride there with Uber" as determined next-actions relevant to the restaurant web page (that is, making a reservation or requesting a ride) and OPENTABLE and UBER are determined to be third-party merchants to provide the next-action functionality. The user can select the button 216 "Ride there with Uber" by tapping on the button 216.

Screen shot 204 shows that the FOURSQUARE app then presents a GUI pop-up card 218 (for example, a pop-up window) to the user in the FOURSQUARE app including real-time inventory information from UBER. For example, the pop-up card 218 shows three inventory items corresponding to three available cars. The user can select a car by tapping on the corresponding inventory item. In some implementations, the card 218 also enables the user to choose the user's current location. In some implementations, the in-app commerce SDK of the FOURSQUARE app can send the user's current location to UBER through the backend service API 108 and the pop-up card 218 can automatically show the user's current location. The pop-up card 218 can also present an icon, for example, an icon 219 "See more on Uber," to enable the user to leave the FOURSQUARE app and go to the UBER app.

Screen shot 206 shows that the FOURSQUARE app presents another (or re-purposed) pop-up card 220 including information of the selected car, the cost of the ride, and a button 222 "Book Ride" allowing the user to book the ride without leaving the FOURSQUARE app. In some implementations, multiple pop-up cards can be layered or one card can be reused to display different information.

Turning to FIG. 2B, screen shot 208 shows that the FOURSQUARE app then presents a pop-up card 224 including the user's payment information, for example, the credit or debit card to be used for the purchase, shipping address, etc. The FOURSQUARE app can obtain the user's payment information from a platform payment provider (such as, ANDROID PAY or APPLE PAY). The user can complete the order within the FOURSQUARE app by, for example, tapping on an icon "Pay with Fingerprint" in the card 224. The FOURSQUARE app can send the order to UBER for processing through the backend service API.

Screen shot 210 shows that the FOURSQUARE app presents a pop-up card 226 including the order status (such as, an order confirmation). The card 226 can also include an icon, for example, an icon 228 "Track trip in Uber," to enable the user to leave the FOURSQUARE app and go to the UBER app. In some implementations, if the user taps on the icon 228 and if the user does not have the UBER app installed on his MCD, the user will be asked to first install the UBER app. If the user has already installed the UBER app, screen shot 212 shows that the user can be deep linked into the UBER app and can perform all available functionalities provided by the UBER app. Note that user information can be passed to the UBER app in the deep linking process so that the UBER app is configured with relevant user data to make the transition as seamless as possible. For example, if the user has already selected a UBER car on the pop-up card, when deep linking to the UBER app, the contextual information of the selected car can be populated in the UBER app for the user to book the specific car.

In some implementations, a specially-designed mobile web browser that communicates with the backend services can be used for the described in-app commerce. This specially-designed mobile web browser can include functionality, such as sending a URL of a web page the user is accessing to the backend services and receiving next-actions and inventory information from the backend services. For example, the mobile web browser can link to a mobile web page of the publisher app, for example, by using a hyperlink. When the user clicks on the hyperlink, the mobile web browser will bring the user to the mobile web page of the publisher app and send the URL of the mobile web page to the backend services. Upon receiving the next-actions and inventory information from the backend services, the mobile web browser can present the next-actions and inventory information to the user and the user can select inventory item(s) for purchase. In other implementations, the publisher app can also embed the special mobile web browser in the publisher app by using a web view.

In some implementations, instead of the platform payment provider providing the user's payment information, the publisher app can integrate with OAuth providers and allow users to log into their account with a merchant on a pop-up card. For example, on the screen shot 206, when the user taps the icon 222 "Book a ride" on the pop-up card 220, the user will log into his UBER account and then book the ride with his UBER account.

Figure 3:
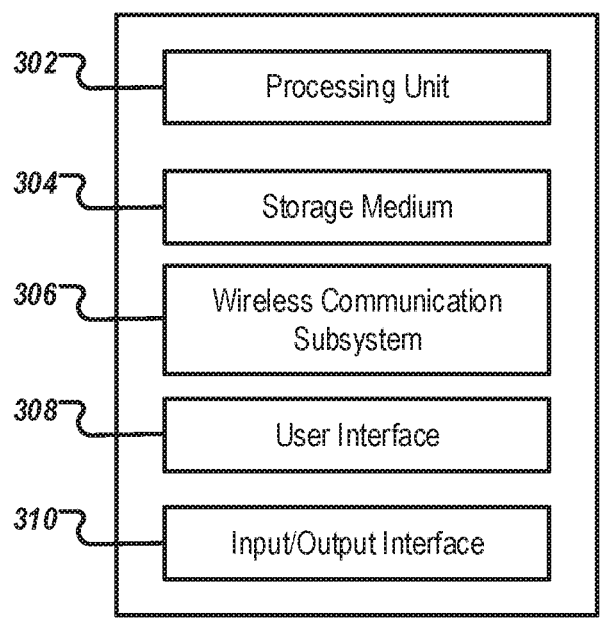
FIG. 3 is a block diagram illustrating an example of a MCD, according to an implementation.

FIG. 3 is a block diagram illustrating an example of a MCD 300, according to an implementation. The example MCD 300 includes a processing unit 302, a computer-readable storage medium 304 (for example, a ROM or flash-type memory), a wireless communication subsystem 306, an interface 308, and an I/O interface 310. The processing unit 302 can include one or more processing components (alternatively referred to as "processors" or "central processing units" (CPUs)) configured to execute instructions related to one or more of the processes, steps, or actions described above in connection with one or more of the implementations disclosed herein. The processing unit 302 can also include other auxiliary components (such as, random access memory (RAM) and read only memory (ROM)). The computer-readable storage medium 304 can be embodied by a non-transitory medium configured to store an operating system (OS) of the device 300 and various other computer-executable software programs for performing one or more of the processes, steps, or actions described above.

The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple input multiple output (MIMO) transmissions. In some implementations, the receivers in the wireless communication subsystems 306 can be an advanced receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. One of ordinary skill in the art will readily appreciate that various other components can also be included in the example MCD 300.

Figure 4:
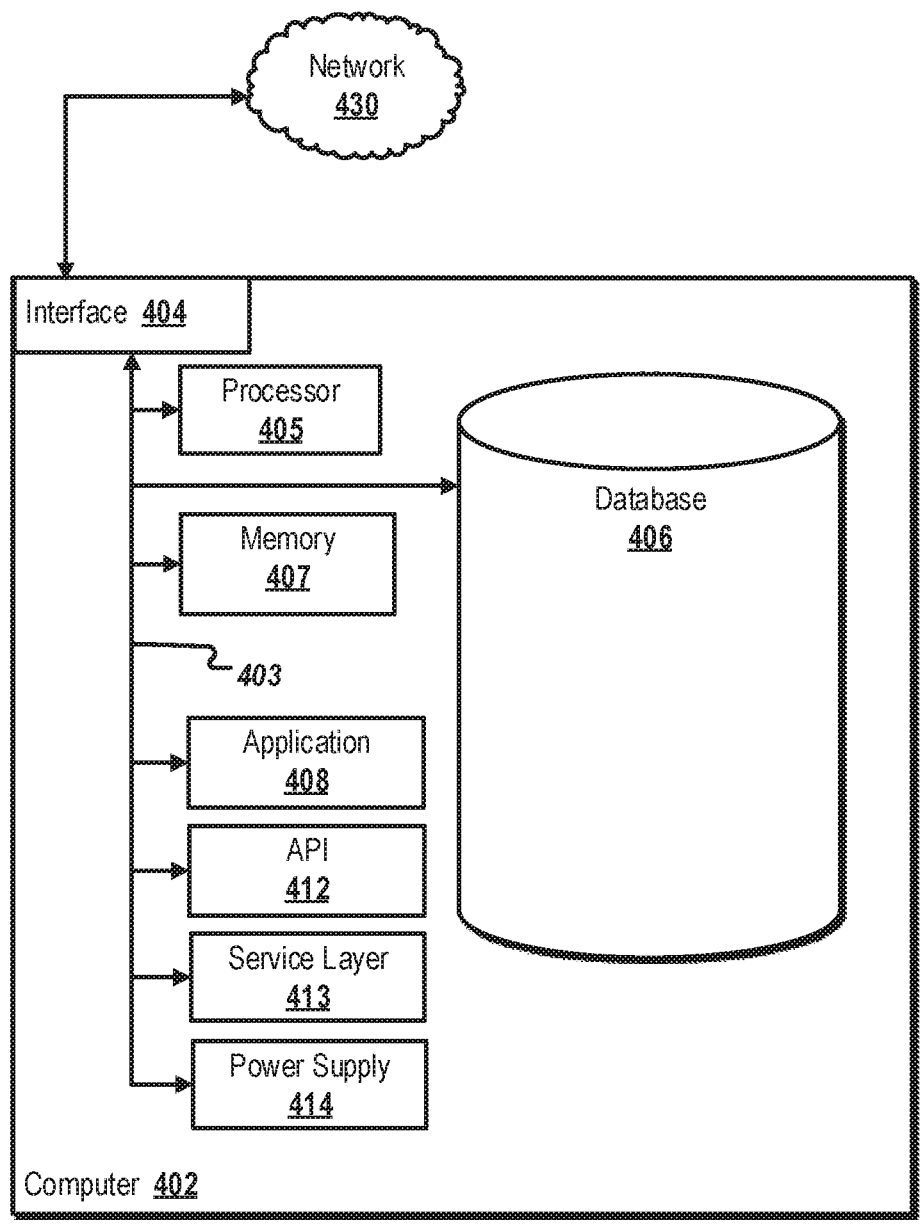
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented system 400 used to provide computational functionalities associated with described algorithms, methods, functions, processes, flows, and procedures, according to an implementation of the present disclosure. In the illustrated implementation, system 400 includes a computer 402 and a network 430.

The illustrated computer 402 is intended to encompass any computing device (including the MCD described in FIG. 3), such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can include an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a distributed computing system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

At a high level, the computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users (for example, from a command console or by another internal access method), external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and includes logic encoded in software, hardware, or a combination of software and hardware. More specifically, the interface 404 can include software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Described implementations of the subject matter can include one or more features, alone or in combination.

For example, in a first implementation, a computer-implemented method, comprising: receiving, at a publisher application and from a backend service, at least one next-action relevant to the publisher application and at least one service provider application associated with the at least one next-action; rendering the at least one next-action, wherein a user's interaction with the rendered at least one next-action enables the user to preview inventory information from the at least one service provider application and to place an order; receiving, at the publisher application and from a payment provider, payment information of the user; sending the order and the payment information to the service provider application though the backend service; and presenting a status of the order to the user.

The foregoing and other described implementations can each, optionally, include one or more of the following features:

A first feature, combinable with any of the following features, further comprising sending a request to the backend service through an in-application (in-app) commerce software development kit (SDK), wherein the request is for the at least one next-action, and wherein the at least one next-action is contextually relevant to the content of a webpage accessed while the publisher application is in use.

A second feature, combinable with any of the previous or following features, wherein the in-app commerce SDK sends user-specific information as part of the request to the backend service.

A third feature, combinable with any of the previous or following features, further comprising analyzing the content of the webpage as contextual predictive input data.

A fourth feature, combinable with any of the previous or following features, further comprising predicting the at least one next-action of the user based on the analyzed content of the webpage.

A fifth feature, combinable with any of the previous or following features, further comprising determining at least one service provider capable of fulfilling the predicted at least one next-action.

A sixth feature, combinable with any of the previous or following features, further comprising querying the at least one service provider through a partner application programming interface (API) for information related to a capability to fulfill the predicted at least one next-action.

In a second implementation, a non-transitory, computer-readable medium storing one or more instructions executable by a computer system to perform operations comprising: receiving, at a publisher application and from a backend service, at least one next-action relevant to the publisher application and at least one service provider application associated with the at least one next-action; rendering the at least one next-action, wherein a user's interaction with the rendered at least one next-action enables the user to preview inventory information from the at least one service provider application and to place an order; receiving, at the publisher application and from a payment provider, payment information of the user; sending the order and the payment information to the service provider application though the backend service; and presenting a status of the order to the user.

The foregoing and other described implementations can each, optionally, include one or more of the following features:

A first feature, combinable with any of the following features, further comprising one or more instructions to send a request to the backend service through an in-application (in-app) commerce software development kit (SDK), wherein the request is for the at least one next-action, and wherein the at least one next-action is contextually relevant to the content of a webpage accessed while the publisher application is in use.

A second feature, combinable with any of the previous or following features, wherein the in-app commerce SDK sends user-specific information as part of the request to the backend service.

A third feature, combinable with any of the previous or following features, further comprising one or more instructions to analyze the content of the webpage as contextual predictive input data.

A fourth feature, combinable with any of the previous or following features, further comprising one or more instructions to predict the at least one next-action of the user based on the analyzed content of the webpage.

A fifth feature, combinable with any of the previous or following features, further comprising one or more instructions to determine at least one service provider capable of fulfilling the predicted at least one next-action.

A sixth feature, combinable with any of the previous or following features, further comprising one or more instructions to query the at least one service provider through a partner application programming interface (API) for information related to a capability to fulfill the predicted at least one next-action.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, at a publisher application and from a backend service, at least one next-action relevant to the publisher application and at least one service provider application associated with the at least one next-action; rendering the at least one next-action, wherein a user's interaction with the rendered at least one next-action enables the user to preview inventory information from the at least one service provider application and to place an order; receiving, at the publisher application and from a payment provider, payment information of the user; sending the order and the payment information to the service provider application though the backend service; and presenting a status of the order to the user.

The foregoing and other described implementations can each, optionally, include one or more of the following features:

A first feature, combinable with any of the following features, further comprising one or more operations to send a request to the backend service through an in-application (in-app) commerce software development kit (SDK), wherein the request is for the at least one next-action, and wherein the at least one next-action is contextually relevant to the content of a webpage accessed while the publisher application is in use.

A second feature, combinable with any of the previous or following features, wherein the in-app commerce SDK sends user-specific information as part of the request to the backend service.

A third feature, combinable with any of the previous or following features, further comprising one or more operations to analyze the content of the webpage as contextual predictive input data.

A fourth feature, combinable with any of the previous or following features, further comprising one or more operations to predict the at least one next-action of the user based on the analyzed content of the webpage.

A fifth feature, combinable with any of the previous or following features, further comprising one or more operations to determine at least one service provider capable of fulfilling the predicted at least one next-action.

A sixth feature, combinable with any of the previous or following features, further comprising one or more operations to query the at least one service provider through a partner application programming interface (API) for information related to a capability to fulfill the predicted at least one next-action.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components (such as units or modules) that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data (such as, logs, policies, security or access data, or reporting files). The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser (such as, interactive fields, pull-down lists, and buttons). These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    displaying, by a publisher application, content on a display of a computing device;
    transmitting, by the publisher application over a network through an in-application (in-app) commerce software development kit (SDK), a request to a backend service for at least one predicted next-action, the at least one predicted next-action being contextually relevant to the content;
    receiving, by the publisher application and from the backend service, at least one predicted next-action relevant to the publisher application, at least one service provider associated with, and capable of fulfilling; the at least one predicted next-action, and a backend public key, wherein the backend public key is received through the in-app SDK; and
    rendering, by the publisher application, the at least one predicted next-action, wherein a user's interaction with the rendered at least one next-action enables the user to view inventory information provided from the at least one service provider and to place an order for one or more items from the inventory with the at least one service provider;
    receiving, at the publisher application and from a payment provider, payment information of the user for an order;
    encrypting, using the backend public key, the payment information; and
    transmitting, through the in-app SDK to the backend service, the encrypted payment information and order.

2. The computer-implemented method of claim 1, wherein the in-app commerce SDK sends user-specific information as part of the request to the backend service including one or more of a current location of the user, a user identifier, or user account information for the user at the at least one service provider.

3. The computer-implemented method of claim 1, further comprising analyzing the content as contextual predictive input data.

4. The computer-implemented method of claim 3, further comprising predicting the at least one predicted next-action of the user based on the analyzed content.

5. The computer-implemented method of claim 3, further comprising determining the at least one service provider capable of fulfilling the at least one predicted next-action.

6. The computer-implemented method of claim 1, further comprising:
    presenting, by the publisher application, a status of the order to the user.

7. A non-transitory, computer-readable medium storing one or more instructions, that when executed by a computer system, cause the computer system to:
    display, by a publisher application, content on a display of a computing device;

transmit, by the publisher application over a network through an in-application (in-app) commerce software development kit (SDK), a request to a backend service for at least one predicted next-action, the at least one predicted next-action being contextually relevant to the content;

receive, by the publisher application and from the backend service, at least one predicted next-action relevant to the publisher application, at least one service provider associated with, and capable of fulfilling, the at least one predicted next-action, and a backend public key, wherein the backend public key is received through the in-app SDK; and render, by the publisher application, the at least one predicted next-action, wherein a user's interaction with the rendered at least one next-action enables the user to view inventory information provided from the at least one service provider and to place an order for one or more items from the inventory with the at least one service provider;

receive, at the publisher application and from a payment provider, payment information of the user for an order;

encrypt, using the backend public key, the payment information; and transmit, through the in-app SDK to the backend service, the encrypted payment information and order.

8. The non-transitory, computer-readable medium of claim 7, wherein the in-app commerce SDK sends user-specific information as part of the request to the backend service including one or more of a current location of the user, a user identifier, or user account information for the user at the at least one service provider.

9. The non-transitory, computer-readable medium of claim 7, further comprising one or more instructions that cause the computer system to analyze the content as contextual predictive input data.

10. The non-transitory, computer-readable medium of claim 9, further comprising one or more instructions that cause the computer system to predict the at least one predicted next-action of the user based on the analyzed content of the webpage.

11. The non-transitory, computer-readable medium of claim 9, further comprising one or more instructions that cause the computer system to determine at least one service provider capable of fulfilling the at least one predicted next-action.

12. The non-transitory, computer-readable medium of claim 7, further comprising one or more instructions that cause the computer system to:

present, by the publisher application, a status of the order to the user.

13. A computer-implemented system, comprising:
one or more computers; and
one or more computer memory devices interoperably coupled with the one or more computers and having tangible, non-transitory, machine-readable media storing one or more instructions that, when executed by the one or more computers, cause the computer system to:

display, by a publisher application, content on a display of a computing device;

transmit, by the publisher application over a network through an in-application (in-app) commerce software development kit (SDK), a request to a backend service for at least one predicted next-action, the at least one predicted next-action being contextually relevant to the content;

receive, by the publisher application and from the backend service, at least one predicted next-action relevant to the publisher application, at least one service provider associated with, and capable of fulfilling, the at least one predicted next-action, and a backend public key, wherein the backend public key is received through the in-app SDK;

render, by the publisher application, the at least one predicted next-action, wherein a user's interaction with the rendered at least one next-action enables the user to view inventory information provided from the at least one service provider and to place an order for one or more items from the inventory with the at least one service provider;

receive, at the publisher application and from a payment provider, payment information of the user for an order;

encrypt, using the backend public key, the payment information;

transmit, through the in-app SDK to the backend service, the encrypted payment information and order; and present, by the publisher application, a status of the order to the user.

14. The computer-implemented system of claim 13, wherein the in-app commerce SDK sends user-specific information as part of the request to the backend service including one or more of a current location of the user, a user identifier, or user account information for the user at the at least one service provider.

15. The computer-implemented system of claim 13, wherein one or more operations analyze the content as contextual predictive input data.

16. The computer-implemented system of claim 15, further comprising one or more operations to:

predict the at least one predicted next-action of the user based on the analyzed content of the webpage; and determine at least one service provider capable of fulfilling the at least one predicted next-action.

17. The computer-implemented system, of claim 13, wherein one or more operations:

present, by the publisher application, a status of the order to the user.

* * * * *